(12) United States Patent
Manfredotti et al.

(10) Patent No.: US 7,347,799 B2
(45) Date of Patent: Mar. 25, 2008

(54) ANTIVIBRATION DEVICE HAVING ROTARY FLYWEIGHTS AND AN EPICYCLIC GEARTRAIN

(75) Inventors: Thomas Manfredotti, La Colle sur Loup (FR); Patrick Quesne, Ecouflant (FR)

(73) Assignees: Eurocopter, Marignane Cedex (FR); Artus, Avrille (FR)

( * ) Notice: Subject to any disclaimer, the term of this patent is extended or adjusted under 35 U.S.C. 154(b) by 239 days.

(21) Appl. No.: 11/350,791

(22) Filed: Feb. 10, 2006

(65) Prior Publication Data

US 2006/0197487 A1    Sep. 7, 2006

(30) Foreign Application Priority Data

Feb. 17, 2005    (FR) ................... 05 01624

(51) Int. Cl.
*F16H 37/06* (2006.01)
*F16H 33/04* (2006.01)

(52) U.S. Cl. .............................. 475/6; 475/5

(58) Field of Classification Search ............ 74/61, 74/87, 570.1; 475/5, 6; 700/280; 702/56
See application file for complete search history.

(56) References Cited

U.S. PATENT DOCUMENTS 3,158,038 A    11/1964    Goodman
4,749,305 A *  6/1988    Brown et al. ............... 404/117
6,212,445 B1   4/2001    Barba et al.
7,086,524 B2 * 8/2006    Hayashi et al. ............. 198/788
7,213,479 B2 * 5/2007    Mitsui .......................... 74/87

FOREIGN PATENT DOCUMENTS

FR    2 852 648         9/2004
JP    62071483 A  *    4/1987

OTHER PUBLICATIONS

Patent Abstracts of Japan, vol. 010, No. 105 (M-471), Apr. 19, 1986 & JP 60 237239 A (Mitsubishi Jukogyo KK), Nov. 26, 1985 abrege.

* cited by examiner

*Primary Examiner*—Ha D. Ho
(74) *Attorney, Agent, or Firm*—Young & Thompson

(57) ABSTRACT

An antivibration device for reducing the vibration of a structure, includes a stationary casing, mounted on the structure, and first and second sets each including two contra-rotary rotors having eccentric flyweights, the flyweights and the rotors being disposed respectively in first and second mutually parallel planes, the centers of rotation of the contra-rotary rotors representing the corners of a rectangular parallelogram in the second plane, and the axes of rotation of the contra-rotary rotors being mutually parallel and orthogonal to the first plane. In addition, it includes a stationary main motor secured to the casing with a through shaft having a first end driving the contra-rotary rotors of the first set and a second end driving the contra-rotary rotors of the second set.

15 Claims, 3 Drawing Sheets

ANTIVIBRATION DEVICE HAVING ROTARY FLYWEIGHTS AND AN EPICYCLIC GEARTRAIN

The present invention relates to an antivibration device of the centrifugal type suitable for use on board aircraft, for example, and in particular in the cabin of a rotorcraft. Nevertheless, the device can be made for any other application when it is desired to reduce or even eliminate vibration generated by a moving body.

BACKGROUND OF THE INVENTION

The vibration present in a rotorcraft cabin is due essentially to the rotation of the main rotor that provides propulsion and lift, and also to the flow of air along the fuselage of the rotorcraft.

U.S. Pat. No. 5,903,077 discloses an antivibration device using eccentric flyweights to generate a force seeking to reduce the vibration of a structure. It comprises two sets of flyweights each provided with a motor which drives a pair of eccentric flyweight rotors, i.e. rotors having centers of gravity that are not situated on their axes of rotation. The rotation of each rotor produces a rotary unbalance. Thus, the device generates a sinusoidal resultant force in the direction perpendicular to the plane containing the axes of rotation of the rotors in any one set.

By using two sets, it is possible to generate a force of adjustable resultant, of frequency equal to the speed of rotation of the rotors, expressed in revolutions per minute (rpm), and of amplitude associated with the angular phase difference between the two sets.

Nevertheless, in the event of one of the motors breaking down, the sets cease to rotate at the same speed, which means that the resultant force is no longer under control. Consequently, the comfort of the occupants of the structure is greatly degraded and can even become worse than in the absence of any antivibration treatment.

Document FR 2 852 648 discloses a device for compensating a vibratory force to which a body is subjected, the main object of the device is to remedy the above-mentioned drawback. That device has two identical sets of two rotors with respective eccentric flyweights, the sets being disposed symmetrically about an axis of symmetry and the axes of rotation of the rotors being mutually parallel and orthogonal to said axis of symmetry.

A single motor of axis disposed perpendicularly to said axis of symmetry sets the rotors into rotation by driving an endless link passing via pulleys mounted coaxially on the rotors so that the lengths of the strands of the link passing through said sets are equal. In addition, the motor is carried by controllable moving equipment capable of sliding along the said axis of symmetry in order to control the phase difference between the eccentric flyweight rotors of the sets.

Thus, a stable vibratory resultant force of determined amplitude and orientation can be generated by that device by moving the controllable moving equipment carrying the motor along the axis of symmetry, said movement acting via said link to vary the angular phase difference between the rotors of the sets progressively so as to bring the eccentric flyweights into the desired position.

In addition, a breakdown of the motor or a break of the endless link causes the device to come to a complete stop and therefore does not make the situation any worse.

Nevertheless, for the device to be accurate, the movement in translation of the controllable moving equipment carrying the motor along the axis of symmetry needs to be extensive. Unfortunately, since this movement in translation is directly linked to the diameter of the pulleys, the pulleys must be large in size. Consequently, it becomes difficult to arrange that device in a small space, such as a rotorcraft cabin, insofar as the space it occupies is not thoroughly optimized.

OBJECTS AND SUMMARY OF THE INVENTION

An object of the present invention is to propose an antivibration device with rotary flyweights that is accurate, robust, and sufficiently compact to enable it to be installed in a restricted space such as a rotorcraft cabin.

According to the invention, an antivibration device for generating a resultant force of adjustable amplitude in order to reduce the vibration of a structure, and in particular of a rotorcraft, comprises a stationary casing arranged on the structure and first and second sets each comprising two contra-rotary rotors with eccentric flyweights, the four flyweights and the four rotors being disposed respectively in first and second mutually parallel planes, the centers of rotation of the contra-rotary rotors representing the corners of a rectangular parallelogram in the second plane and the axes of rotation of the contra-rotary rotors being mutually parallel and orthogonal to the first plane. The device is remarkable in that it includes a main motor that is stationary, secured to the casing, and having a through shaft driving via its first end the contra-rotary rotors of the first set, and via its second end the contra-rotary rotors of the second set.

As explained below, the angular phase difference between the flyweights of the second set relative to the flyweights of the first set is not modified by moving the main motor in linear translation, and that makes it possible to optimize the compactness of the device.

In addition, since the two rotors in each set are disposed symmetrically about a longitudinal axis of symmetry, the main motor is arranged inside the rectangular parallelogram along the axis of symmetry. This disposition makes the device correspondingly more compact.

Furthermore, a first orthogonal gear, centered on the axis of rotation of the main motor, drives the contra-rotary rotors with eccentric flyweights of the first set when it is set into motion by the main motor. Thus, the axis of rotation of the first orthogonal gear is disposed in the second plane while being orthogonal to the axes of rotation of the contra-rotary rotors of the first set, thus corresponding to the term "orthogonal gear" as used in the present text for convenience.

To this end, the first end of the through shaft of the main motor has a first sun gear for setting into motion a first outer ring gear that is constrained to rotate with the first orthogonal gear. Since the speed of rotation of the main motor can be high, the device of the invention includes speed-reducing gearing, i.e. at least one first planet gear arranged on a first stationary planet carrier and disposed between the first sun gear and the first outer ring gear. The number of planet gears depends in particular on the speed of rotation of the main motor and on the speed of rotation to be reached by the rotors having eccentric flyweights in the first set.

Similarly, a second orthogonal gear drives the contra-rotary rotors with eccentric flyweights of the second set when it is set into motion by the main motor. The axis of rotation of the second orthogonal gear is also disposed in the second plane while being orthogonal to the axes of rotation of the contra-rotary rotors of the second set.

The second end of the through shaft of the main motor thus has a second sun gear for setting into motion a second outer ring gear constrained to rotate with the second orthogonal gear.

To be able to adjust the resultant force from the device, the contra-rotary rotors with eccentric flyweights of the second set can be phase-shifted angularly relative to the contra-rotary rotors with eccentric flyweight of the first set. The phase difference can lie in the range 0° to 180° in order to enable-the resultant force to vary from a maximum value to a zero value as a function of requirements. Consequently, the device of the invention includes phase-shifter means for slowing down or accelerating, at least temporarily, the speed of rotation of the contra-rotary rotors with eccentric flyweights of the second set so as to vary the angular phase difference between the rotors with eccentric flyweights of the second set relative to the rotors with eccentric flyweights of the first set. Once the desired phase difference is reached, the phase-shifter means cease to act, and all four contra-rotary rotors with eccentric flyweights rotate at identical speed proportional to the speed of rotation of the main motor.

The phase-shifter means is rotary and comprises at least one second planet gear arranged on a second planet carrier that is movable in rotation relative to the second end disposed between the second sun gear and the second outer ring gear. By using a stationary secondary motor to cause the second planet carrier to turn together with the associated second planet gear, with turning being either clockwise or counterclockwise, it is possible to decrease or increase the speed of rotation of the group comprising the second outer ring gear, the second orthogonal gear and the contra-rotary rotors with eccentric flyweights of the second set, thereby varying the angular phase difference between those flyweights and the eccentric flyweights of the first set.

Depending on the space available around the device, two embodiments can be envisaged, a first embodiment in which the main and secondary motors are concentric, and a second embodiment in which the main and secondary motors are arranged in succession along the above-described longitudinal axis of symmetry.

To make the device automatic, a computer varies the angular phase difference between the contra-rotary rotors with eccentric flyweights of the second set relative to the contra-rotary rotors with eccentric flyweights of the first set as a function of signals coming from a plurality of sensors and as a function of the level of vibration in the structure.

Finally, the shape of the flyweights is also optimized so as to minimize the size of the device. Each set thus has one rotor with a thick flyweight provided with two identical disk portions separated by a groove, the other rotor then having a thin flyweight provided with a single disk portion of thickness slightly smaller than the width of said groove, the thin and thick flyweights naturally being identical in weight. Thus, the eccentric flyweights of the rotors of one set can overlap each other, thereby reducing the overall size of the device. Furthermore, the distance between the center of gravity of the thin flyweight and its axis of rotation is advantageously equal to the distance of said center of gravity of the thick flyweight and its axis of rotation.

BRIEF DESCRIPTION OF THE DRAWINGS

The invention and its advantages appear in greater detail from the following description which shows preferred embodiments given without any limiting character, and described with reference to the accompanying figures, in which.

MORE DETAILED DESCRIPTION

Elements that are present in a plurality of different figures are given the same reference in all of them.

Figure 1:
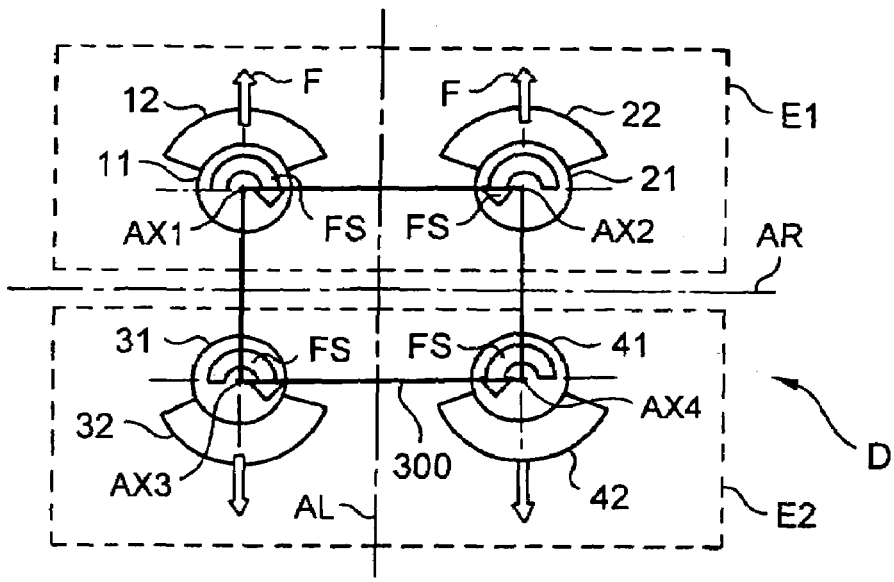
FIGS. 1, 2, and 3 are diagrams for explaining the principle on which the invention operates.
Figure 2:
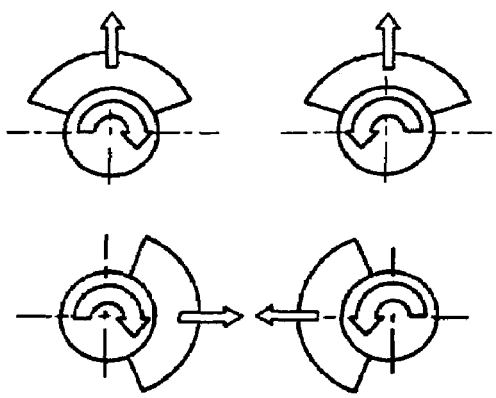
Figure 3:
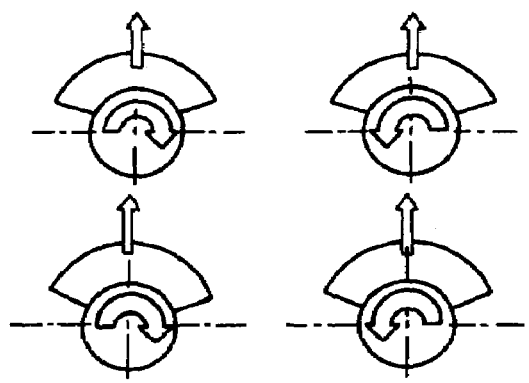

FIGS. 1, 2, and 3 show the operating principle of the antivibration device D of the invention having eccentric flyweights.

The device D comprises two sets E1 and E2. The first set E1 is provided with two contra-rotary rotors 11 and 21 with respective eccentric flyweights 12 and 22. Similarly, the second set E2 is provided with two contra-rotary rotors 31 and 41 with respective eccentric flyweights 32 and 42.

Advantageously, the four rotors are identical and the four flyweights are of equal weight.

In addition, the four rotor and the associated four flyweights are respectively arranged on second and first planes 200 and 100 that are mutually parallel, with the respective axes of rotation AX1, AX2, AX3, and AX4 of the rotors 11, 21, 31, and 41 having eccentric flyweights 12, 22, 32, and 42 being mutually parallel and orthogonal to the first and second planes 100 and 200. In addition, since each rotor 11, 21, 31, and 41 together with its associated eccentric flyweights 12, 22, 32, and 42 are disposed coaxially, the axes of rotation AX1, AX2, AX3, and AX4 represent respectively the axes of rotation not only of the rotors 11, 21, 31, and 41, but also of the associated eccentric flyweights 12, 22, 32, and 42.

In addition, the centers of rotation of the rotors 11, 21, 31, and 41 constitute the corners of a rectangular parallelogram 300 in the second plane 200.

Furthermore, the rotors 11 & 21 and 31 & 41 with eccentric flyweights 12 & 22 and 32 & 42 of one set are symmetrical about a longitudinal axis of symmetry AL and rotate in opposite directions as represented by arrows FS, with the rotors 11 & 31 and 21 & 41 that are facing about an axis AR between the first and second sets E1 and E2 having the same directions of rotation.

As a result, each flyweight 12, 22, 32, and 42 generates a rotating centrifugal force F.

Using only one of the sets E1 or E2 of two contra-rotary flyweights 12 & 22 or 32 & 42 having the same speed of rotation, a sinusoidal force generator is obtained delivering a resultant force that is perpendicular to the axes of rotation of the two flyweights of the set and in alignment along the longitudinal axis of symmetry AL contained in the first plane 100. This force generator can be used to reduce or even eliminate the level of vibration of a structure. Nevertheless, it does not enable the amplitude of the resultant force to be adjusted.

To remedy that, it is therefore necessary to use two sets E1 and E2 each of two contra-rotary flyweights 12 & 22 and 32 & 42 in alignment, all four flyweights 12, 22, 32, and 42 rotating at the same speed. By varying the angular phase difference between the flyweights of the second set E2 and the flyweights of the first set E1, it is possible to vary the resultant force between a maximum value and a zero value.

With reference to FIG. 1, the phase difference is 180°, leading to a resultant force that is zero.

With reference to FIG. 2, the phase difference is 90°. The corresponding resultant force then corresponds to twice the centrifugal force of one flyweight.

Finally, with reference to FIG. 3, the phase difference is 0°. The resultant force is at its maximum and then corresponds to four times the centrifugal force of one flyweight.

Figure 4:
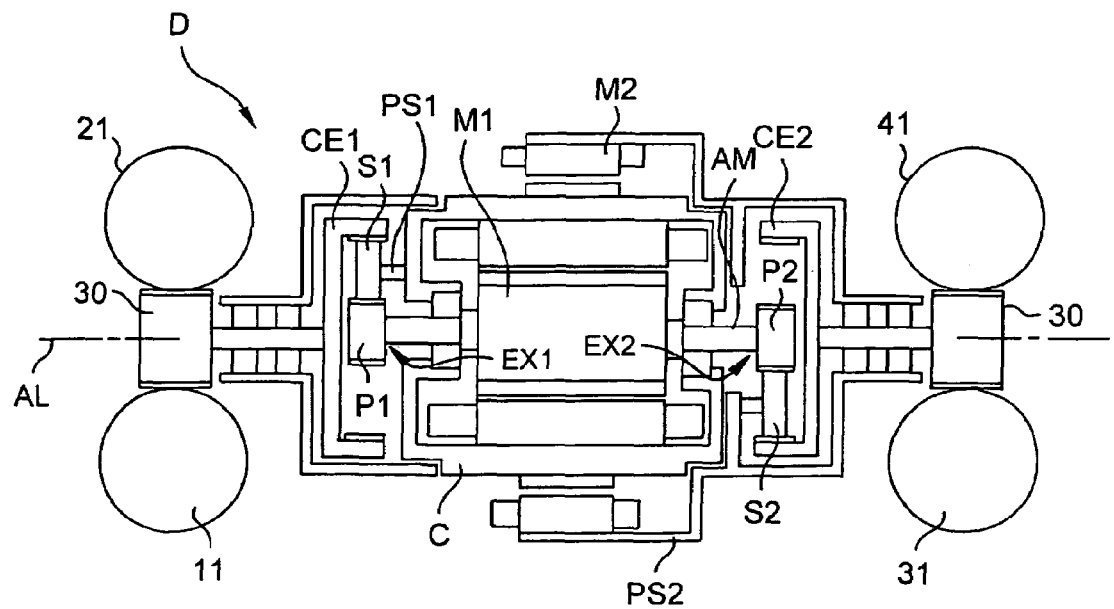
FIG. 4 shows a first embodiment of the device of the invention.

FIG. 4 shows a first embodiment of the device D.

It comprises a casing C secured to a structure that is not shown. A main motor M1 secured to the casing C and disposed between the two sets E1 and E2 along the longitudinal axis of symmetry AL serves to rotate the rotors 11, 21, 31, and 41.

Consequently, a through shaft AM, provided with first and second sun gears P1 and P2 respectively at its first and second ends EX1 and EX2, passes through the main motor M1 along the longitudinal axis of symmetry AL.

The first sun gear P1 drives a first outer ring gear CE1 constrained to rotate with a first orthogonal gear 30 which transmits rotary motion to the rotors 11 & 21 with eccentric flyweights 12 & 22 of the first set E1. Since the speed of rotation of the main motor is high, speed-reducing gearing of the planet type is provided. This gearing comprises at least one first planet gear S1 arranged on a planet carrier PS1 that is stationary and secured to the casing C. The first planet gear S1 co-operates with the first sun gear P1 and the first outer ring gear CE1.

The number of planet gears is directly associated with the power of the main motor.

Furthermore, the second sun gear P2 drives an outer ring CE2 constrained to rotate with a second orthogonal gear 30 which transmits rotary motion to the rotors 31 and 41 with eccentric flyweights 32 and 42 of the second set E2.

In addition, phase-shifter means for varying the phase difference enable the speed of rotation of the rotors 31 and 41 of the second set E2 to be increased or reduced transiently relative to the speed of rotation of the rotors 11 and 21 of the first set E1 so as to modify the amplitude of the resultant force produced by the device D. Once the phase difference has been varied, the phase-shifter means remain stationary so that the rotors 31 and 41 of the second set E2 and the rotors 11 and 21 of the first set E1 all rotate at the same speed.

These phase-shifter means comprise at least one second planet gear S2 mounted on a second planet carrier PS2 that is rotatable about the second end EX2 of the through shaft AM, and that co-operate with the second sun gear P2 and the second outer ring gear CE2.

In this first embodiment, the second planet carrier PS2 is turned by a secondary motor M2 concentric about the main motor M1.

It should be observed that shifting the angular phase of the flyweights of the second set E2 through 180°, for example, does not necessarily correspond to the second planet carrier PS2 turning through 180°. Account must also be taken of the diameters of the various gears. Thus, to obtain a phase-shift through 180°, it might be necessary to cause the second planet carrier to turn through several revolutions, for example.

In order to enable the device D to operate properly under steady conditions, the four rotors 11, 21, 31, and 41 driven by the single main motor M1 must all rotate at the same speed of rotation. The first and second sun gears P1 and P2 are then advantageously identical (both in number and in dimension), and the same applies to the first and second planet gears S1 and S2, the first and second outer ring gears CE1 and CE2, and the orthogonal gears 30.

Furthermore, sensors (not shown) deliver signals relating to the phases of the flyweights and/or to the positions of the main and secondary motors M1 and M2, in particular if they are of the brushless type, these signals being received by a computer (not shown in the figure). The computer also receives information relating to the vibration of the structure on which the device is mounted, and is then in a position to control the main and secondary motors M1 and M2 so as to optimize the resultant force produced by the device in order to reduce said vibration.

FIG. 4 is a diagrammatic view. Consequently it does not show all of the mechanical parts of the device. Nevertheless, it will be understood that the usual means (screws, journals, ball bearings, etc.) are present so as to allow the following elements to rotate about their axes of rotation: the through shaft AM of the main motor M1; the first and second sun gears P1 and P2; the first and second planet gears S1 and S2; the first and second outer ring gears CE1 and CE2; the orthogonal gears 30; and the rotors 11, 21, 31, and 41 with eccentric flyweights 12, 22, 32, and 42. The other elements are secured to the casing C by the usual means.

Figure 5:
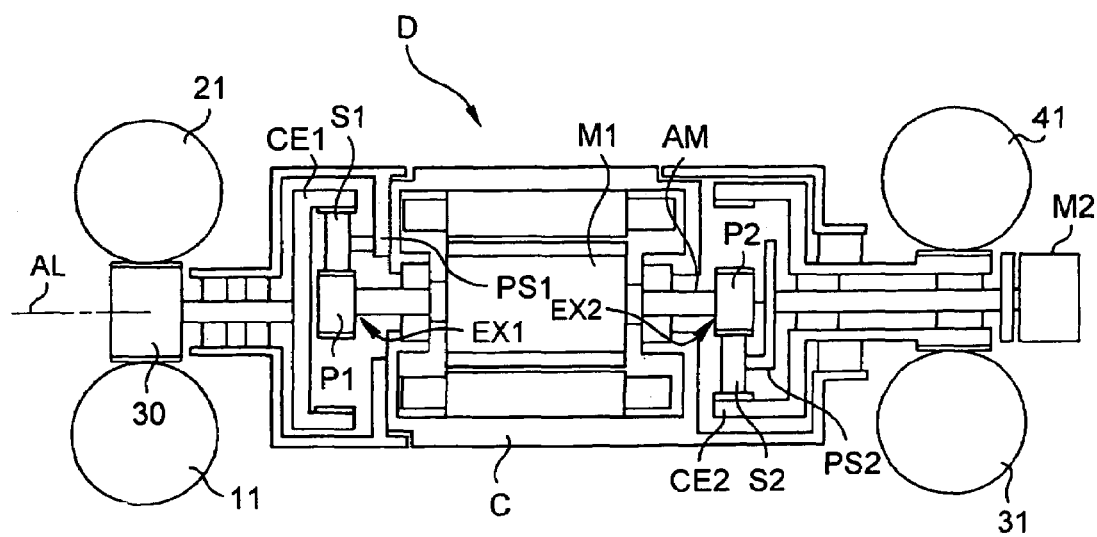
FIG. 5 shows a second embodiment of the device of the invention.

With reference to FIG. 5, in a second embodiment, the main and secondary motors M1 and M2 are not concentric, but in line, i.e. they are disposed in succession along the longitudinal axis of symmetry AL.

Furthermore, sensors deliver signals relating to the phases of the flyweights and to the positions of the main and secondary motors M1 and M2 to a computer (not shown).

Figure 6:
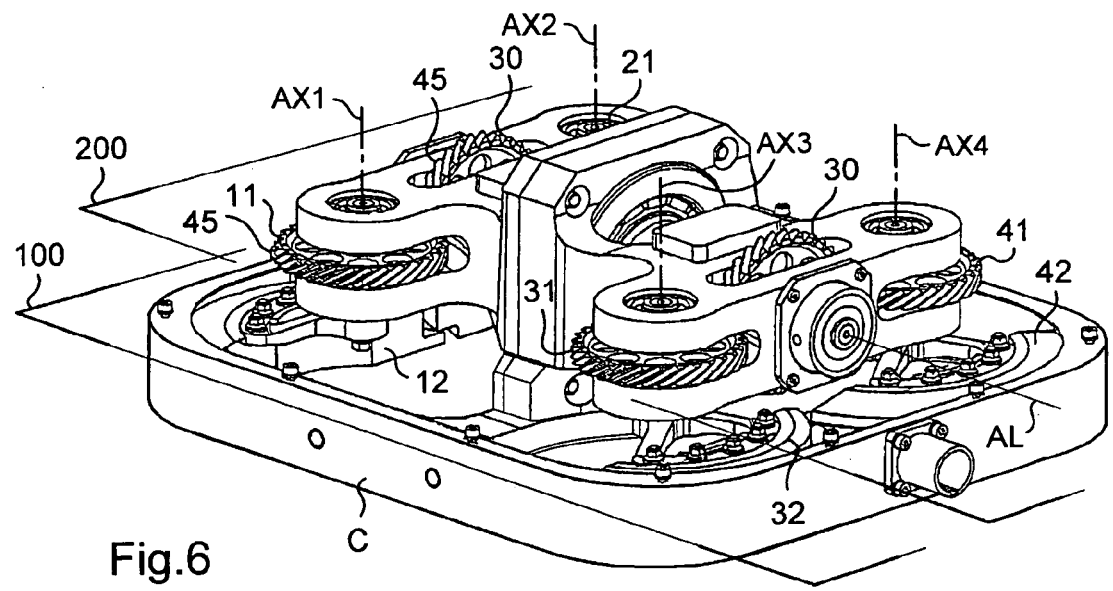
FIG. 6 is an isometric view of the device.

FIG. 6 is an isometric view showing clearly the compact nature of the device D.

The four rotors 11, 21, 31, and 41 are positioned in the same second plane 200. Similarly, the associated eccentric flyweights 12, 22, 32, and 42 are positioned in the first plane 100.

Furthermore, the respective axes of rotation AX1, AX2, AX3, and AX4 of the rotors 11, 21, 31, and 41 are mutually parallel and orthogonal to the first and second planes 100 and 200.

The two rotors 11 & 21 and 31 & 41 in each set E1 and E2 are driven to rotate in opposite directions by an orthogonal gear 30. The axis of rotation of the orthogonal gears 30 corresponds to the longitudinal axis of symmetry AL lying in the second plane 200.

Furthermore, in order to ensure high quality drive, the teeth 45 of the orthogonal gears 30 and of the rotors 11, 21, 31, and 41 are at an angle relative to their respective axes of rotation, e.g. corresponding to helical sets of teeth with perpendicular axes.

Furthermore, the casing C advantageously presents a top portion (not shown) that covers the device, in particular its rotary elements.

Figure 7:
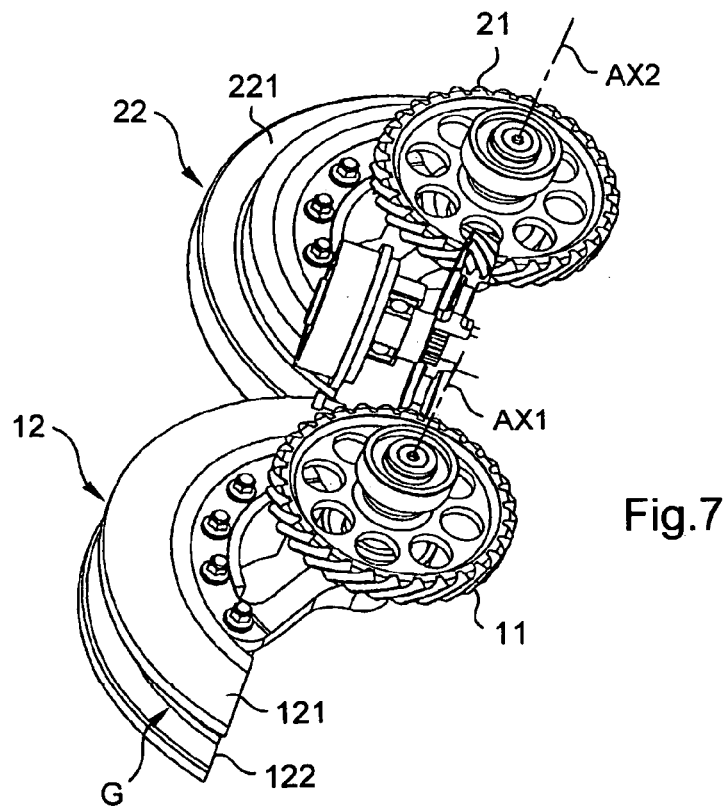
FIG. 7 is a view showing the shape of the flyweights.

FIG. 7 is a view showing the shape of the flyweights in one of the sets.

More precisely it shows the set E1 having the rotors 11, 21 with eccentric flyweights 12, 22. Nevertheless, the description below is equally applicable to the eccentric flyweights 32, 42 of the rotors 31, 41 of the second set E2.

The set E1 comprises one thick flyweight, specifically the eccentric flyweight 12, and one thin flyweight, the eccentric flyweight 22.

The thick flyweight 12 has two disk portions 121, 122 separated by a groove G. The thin flyweight 22 comprises a single disk portion 221 of thickness that is slightly smaller than the width of the groove G so that the thick and thin flyweights 12 and 22 can overlap in part, the disk portion 221 being received in the groove G. The distance between the axes of rotation AX1 and AX2 of the rotors 11 and 21 having eccentric flyweights 12 and 22 is thereby minimized, leading to a corresponding reduction in the overall size of the device D.

Nevertheless, the masses of the two flyweights in any one set remain equal. Thus, the thickness of the disk portion 221 of the thin flyweight 22 is advantageously substantially equal to the sum of the thicknesses of the two disk portions 121 and 122 of the thick flyweight 12.

In addition, the distance between the center of gravity of the thin flyweight 22 and its axis of rotation AX2 is equal to the distance between the center of gravity of the thick flyweight 12 and its axis of rotation AX1.

Naturally, the present invention can be embodied in numerous ways. Although several embodiments are described above, it will be understood that it is not conceivable to identify exhaustively all possible embodiments. It is naturally possible to envisage replacing any of the means described by equivalent means without going beyond the ambit of the present invention.

What is claimed is:

1. An antivibration device (D) for reducing the vibration of a structure, the device comprising a stationary casing (C) mounted on the structure and with first and second sets (E1, E2) each comprising two contra-rotary rotors (11 & 21 and 31 & 41) with eccentric flyweights (12 & 22 and 32 & 42), said flyweights (12, 22, 32, 42) and said rotors (11, 21, 31, 41) being disposed respectively in first and second mutually parallel planes (100, 200), the centers of rotation of said contra-rotary rotors (11, 21, 31, 41) representing the corners of a rectangular parallelogram (300) in said second plane (200), and the axes of rotation (AX1, AX2, AX3, AX4) of said contra-rotary rotors (11, 21, 31, 41) being mutually parallel and orthogonal to said first plane (100),
the device including a stationary main motor (M1) secured to said casing (C), with a through shaft (AM) having a first end (EX1) driving said contra-rotary rotors (11, 21) of said first set (E1) and a second end (EX2) driving said contra-rotary rotors (31, 41) of said second set (E2).

2. A device according to claim 1, wherein the two rotors (11 & 21 and 31 & 41) of each set (E1, E2) are disposed symmetrically about a longitudinal axis of symmetry (AL), and said main motor (M1) is arranged inside said rectangular parallelogram (300) along said axis of symmetry (AL).

3. A device according to claim 1, including a first orthogonal gear (30) driving said contra-rotary rotors (11, 21) with eccentric flyweights (12, 22) of said first set (E1) when it is set into motion by said main motor (M1), the axis of rotation of said first orthogonal gear being disposed in said second plane (200) and being orthogonal to said axes of rotation (AX1, AX2) of said contra-rotary rotors (11, 21) of said first set (E1).

4. A device according to claim 3, wherein said first end (EX1) of said through shaft (AM) carries a first sun gear (P1) for setting into motion a first outer ring gear (CE1) constrained to rotate with said first orthogonal gear (30).

5. A device according to claim 4, including speed-reducing gearing for reducing the speed of rotation of said rotors (11, 21) having eccentric flyweights (12, 22) of said first set (E1).

6. A device according to claim 5, wherein said speed-reducing gearing includes at least a first planet gear (S1) mounted on a stationary first planet carrier (PS1) disposed between the first sun gear (P1) and the first outer ring gear (CE1).

7. A device according to claim 1, including a second orthogonal gear (30) driving said contra-rotary rotors (31, 41) with eccentric flyweights (32, 42) of said second set (E2) when it is set into motion by said main motor (M1), the axis of rotation of said second orthogonal gear (30) being disposed in said second plane (200) and being orthogonal to said axes of rotation (AX3, AX4) of said contra-rotary rotors (31, 41) of said second set (E2).

8. A device according to claim 7, wherein said second end (EX2) of said through shaft (AM) carries a second sun gear (P2) for setting into motion a second outer ring gear (CE2) constrained to rotate with said orthogonal gear (30).

9. A device according to claim 8, including phase-shifter means for slowing down or accelerating, at least temporarily, the speed of rotation of said rotors (31, 41) with eccentric flyweights (32, 42) of said second set (E2) in such a manner as to vary their angular phase difference relative to said rotors (11, 21) with eccentric flyweights (12, 22) of said first set (E1).

10. A device according to claim 9, wherein said phase-shifter means comprise at least one second planet gear (S2) arranged on a second planet carrier (PS2) that is movable in rotation relative to said second end (EX2), being disposed between the second sun gear (P2) and the second outer ring gear (CE2).

11. A device according to claim 10, wherein said second planet carrier (PS2) is set into motion by a secondary motor (M2).

12. A device according to claim 11, wherein said main and secondary motors (M1, M2) are concentric.

13. A device according to claim 11, wherein the two rotors (11 & 21 and 31 & 41) of each set (E1 and E2) are disposed symmetrically about a longitudinal axis of symmetry (AL), and said main and secondary motors (M1, M2) are arranged in succession along said longitudinal axis of symmetry (AL).

14. A device according to claim 1, including a computer for varying the angular phase difference between said rotors (31, 41) with eccentric flyweights (32, 42) of said second set (E2) relative to said rotors (11, 21) with eccentric flyweights (12, 22) of said first set (E1) as a function of signals coming from a plurality of sensors.

15. A device according to claim 1, wherein each set (E1, E2) comprises one rotor having a thick eccentric flyweight provided with two identical disk portions (121, 122) separated by a groove (G), the other rotor then having a thin eccentric flyweight provided with a single disk portion (221) of thickness lying slightly smaller than the width of said groove (G), the thick and thin flyweights being identical in weight.

* * * * *